W. H. DOBLE & C. M. WHEATON.

G. H. WHEATON, ADMINISTRATRIX OF C. M. WHEATON, DEC'D.

FOLDING BOX OR SHIPPING CASE.

APPLICATION FILED FEB. 23, 1918.

Reissued May 14, 1918.

14,471.

3 SHEETS—SHEET 1.

INVENTORS:

William H. Doble
Carl M. Wheaton, deceased
Grace H. Wheaton, administratrix by Macleod, Calver, Copeland & Bile Attys.

W. H. DOBLE & C. M. WHEATON.

G. H. WHEATON, ADMINISTRATRIX OF C. M. WHEATON, DEC'D.

FOLDING BOX OR SHIPPING CASE.

APPLICATION FILED FEB. 23, 1918.

Reissued May 14, 1918.

14,471.

3 SHEETS—SHEET 2.

INVENTORS:

William H. Doble
Carl M. Wheaton, deceased
Grace H. Wheaton, administratrix by Macleod, Calver, Copeland & Dike Attys.

W. H. DOBLE & C. M. WHEATON.

G. H. WHEATON, ADMINISTRATRIX OF C. M. WHEATON, DEC'D.

FOLDING BOX OR SHIPPING CASE.

APPLICATION FILED FEB. 23, 1918.

Reissued May 14, 1918.

14,471.

3 SHEETS—SHEET 3.

INVENTORS:

William H. Doble

Earl M. Wheaton, deceased

Grace H. Wheaton, administratrix by Macleod, Calver, Copeland & Dible

Attys.

UNITED STATES PATENT OFFICE.

WILLIAM H. DOBLE, OF QUINCY, AND CARL M. WHEATON, DECEASED, LATE OF NEWTON, MASSACHUSETTS, BY GRACE H. WHEATON, ADMINISTRATRIX, OF NEWTON, MASSACHUSETTS; SAID DOBLE AND SAID CARL M. WHEATON ASSIGNORS, BY DIRECT AND MESNE ASSIGNMENTS, OF THREE-FOURTHS TO SAID WILLIAM H. DOBLE AND ONE-FOURTH TO PNEUMATIC SCALE CORPORATION LIMITED, OF QUINCY, MASSACHUSETTS, A CORPORATION OF MAINE.

FOLDING BOX OR SHIPPING-CASE.

14,471. Specification of Reissued Letters Patent. Reissued May 14, 1918.

Original No. 941,013, dated November 23, 1909, Serial No. 448,642, filed August 15, 1908. Application for reissue filed February 23, 1918. Serial No. 218,907.

*To all whom it may concern:*

Be it known that WILLIAM H. DOBLE, a citizen of the United States, residing at Quincy, in the county of Norfolk, State of Massachusetts, and CARL M. WHEATON, deceased, a citizen of the United States, late of Newton, county of Middlesex, and State of Massachusetts, did invent a certain new and useful Improvement in Folding Boxes or Shipping-Cases, of which the following is a specification, reference being had therein to the accompanying drawings.

The special object of the invention is to provide a folding box of sufficient size and strength to serve as a shipping case in which goods may be packed for shipping and the goods be protected against damage by breaking of the case while being handled and which can be folded into small compass to be returned to the shipper. The box is of rectangular form having as usual a bottom, two sides, two ends and a cover, all of which members are adapted to be hinged together, and preferably are divided into sets of three members each; that is preferably one set of three of said members are hinged together, another set of three members are hinged together, and the two sets thus formed are adapted to be hinged together by a draw hinge when they are set up and are adapted to be separated from each other so that when the box is knocked down, each set may be folded by itself. Preferably also each of said members, that is, each of said side and end pieces, and the top and bottom, has an inner and an outer wall with an air space between the walls, said inner and outer walls being held together by strengthening plates or corrugated plates, the inner and outer walls coöperating to help form the hinged joints.

One feature of the invention relates to the form of the corrugated plates which have broad, flat faces. Other features of the invention will be particularly set forth hereinafter.

The invention will be understood from the following description when taken in connection with the accompanying drawings and the novel features thereof will be pointed out and clearly defined in the claims at the close of this specification.

In the drawings, Figure 1 is a perspective view of a box embodying the invention, the cover being shown partially open and the locking rod which locks the cover to the front wall of the box being shown detached.

Figure 4:
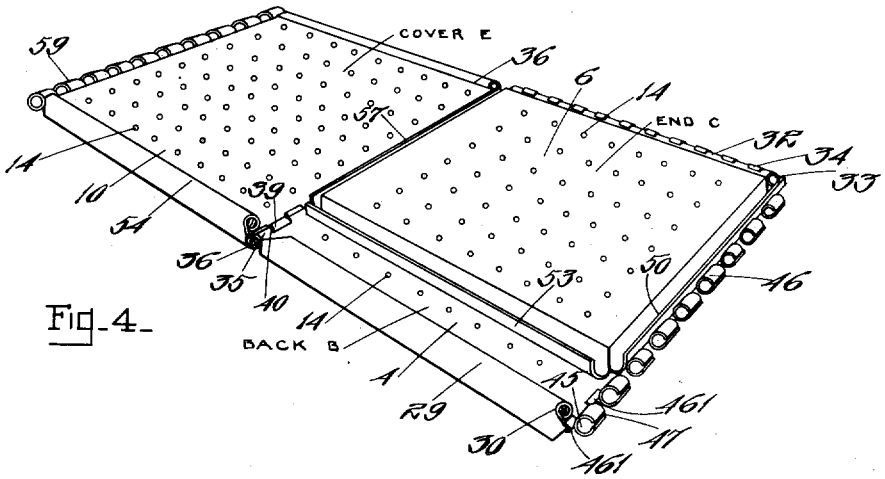
Fig. 4 is a perspective view of the cover and back and the other end which constitute the second set, showing them in the knocked down position, the end member folded over onto the back member.
Figures 2, 3:
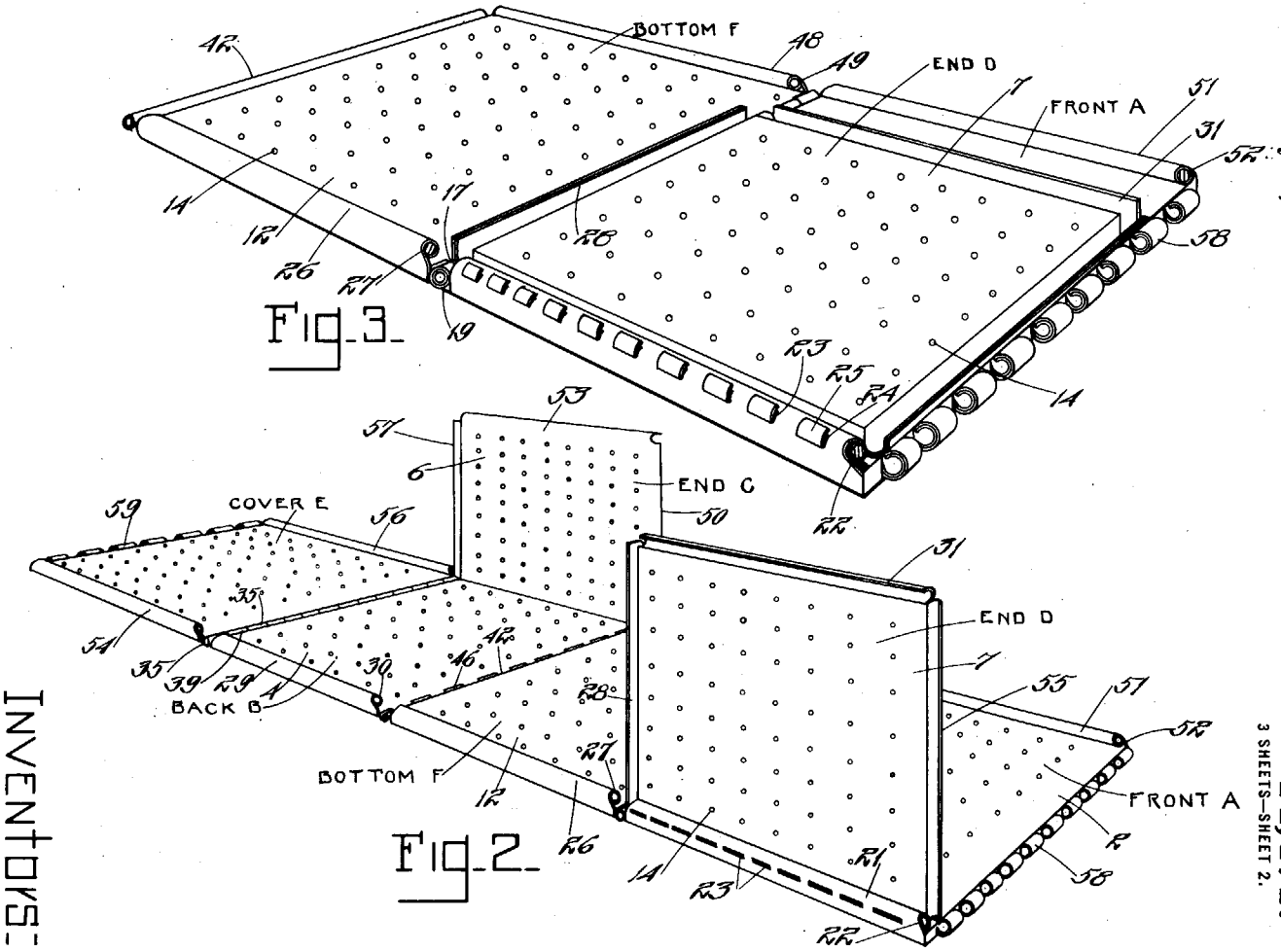
Fig. 2 is a perspective view of the box partially knocked down, before the two sides are separated from each other and with both of the end walls in a vertical position as before being folded.
Fig. 3 is a perspective view of the bottom, front and one end which constitute one set and are shown in their fully knocked down position, the end member being folded over onto the front member.

Referring to the drawings, the principal members of the box are the front A, the back B, the two ends C and D, the cover E and the bottom F. The front A, the bottom F and the end D are all hinged together and form one set as shown in Fig. 3 when the box is in its knock down form. The back B, cover E and end C are all hinged together and when in their knock down form, form the second set as shown in Fig. 4. The bottom F and back B have a draw hinge connection with each other as will be hereinafter described, whereby the two sets may be connected together as shown in Fig. 2 before the box is set up. Each of the above six members comprises an outer plate and an inner plate with a space between them, and united together by corrugated plates 13 in the space between the outer and inner plates. The front A has an outer plate 1 and an inner plate 2. The back B has an outer plate 3 and an inner plate 4. The end C has an outer plate 5 and an inner plate 6. The end D has an outer plate 7 and an inner plate 8. The cover E has an outer plate 9 and an inner plate 10 and the bottom F has an outer plate 11 and an inner plate 12. The corrugated plates between the walls are all substantially alike except at their side edges and are represented by the numeral 13.

The corrugated plates 13 between the walls are corrugated or formed with strut portions to cross between the inner and outer plates and with flat portions which are secured to the inner and outer plates by suitable fastening means.

The corrugated plates 13 are formed with broad flat faced portions *a* at intervals apart in the same plane with each other which contact with the flat outer wall plate and are secured thereto, and are formed with broad flat faced portions *b* at intervals apart in the same plane with each other which contact with the flat inner wall plate and are secured thereto. The flat portions *a* are parallel with the flat portions *b* and alternate therewith. The flat portions *a* are connected with the adjacent flat portions *b* by transverse strut portions *c* which extend crosswise of the space between the inner and outer wall plates. Thus between each pair of inner and outer wall plates there is a corrugated plate having flat faced portions which alternately contact with the inner and outer wall plates and are secured thereto and are connected together by strut portions.

Preferably the planes of the strut portions *c* are at an obtuse angle to the planes of the strut portions *a* and *b*, and preferably also the corners *d* formed at the bends in the corrugated plate at the juncture of the flat faces *a* and *b* with the strut portions *c* are all abrupt turns as such a construction not only makes a broader contact of the surfaces *a* and *b* with the outer and inner wall plates than if the corners of the edges of the flat faces were rounded, but it also makes the entire wall more rigid.

The plane of each strut portion is at an angle to the plane of each adjacent strut portion viewed in one direction, but the longitudinal direction of all of the strut portions of each corrugated plate are parallel with each other.

Figure 7:
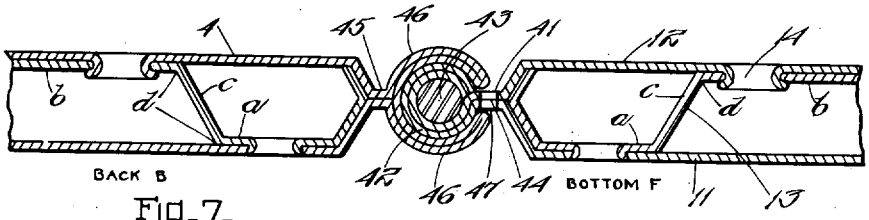
Fig. 7 is a section through the hinge connection between the back and bottom when laid out flat as in Fig. 2.
Figure 5:
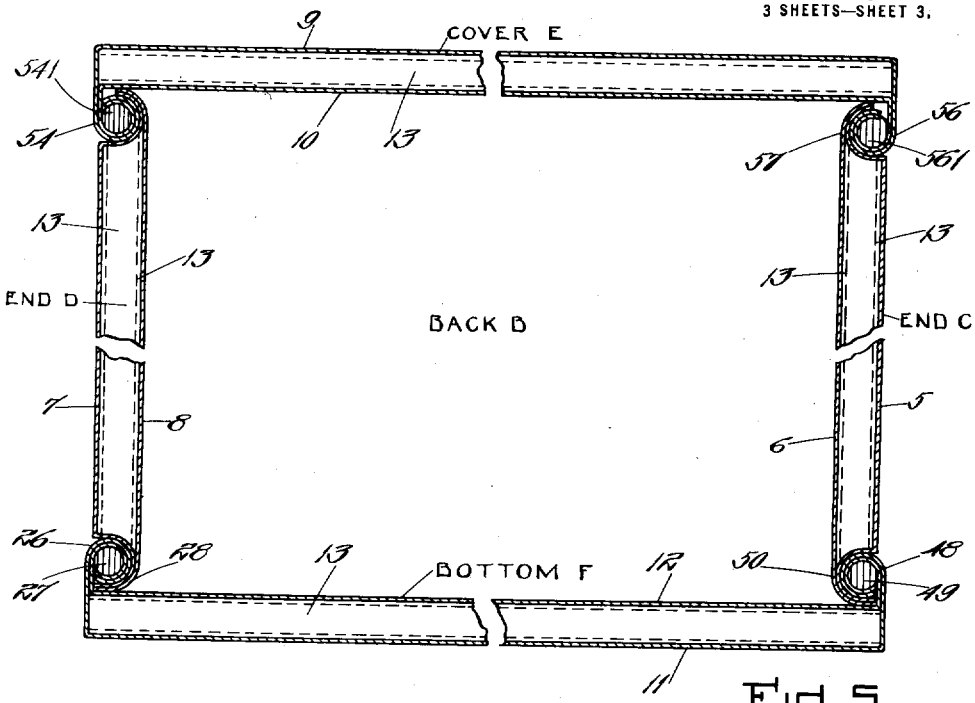
Fig. 5 is a longitudinal vertical section of the box fully set up and the cover closed.

These corrugated plates are firmly secured to the inner and outer wall plates by any suitable means so that there shall be no creeping. Any suitable means of securing them may be employed. The means shown consists of eyelets 14 struck up from the outer plate and from the flat faces of the corrugated plate, that is some of the connections are made by striking up the outer wall plate to form eyelets which pass through holes in the flat faces *a* of the corrugated plate and other connections are made by striking up some of the flat faces *b* to form eyelets which pass through holes in the inner wall plate, as shown in Figs. 5 and 7. Any other suitable means, however, may be employed for uniting the corrugated plate to the wall plates.

The corrugated plates thus formed and united with the inner and outer wall plates form a series of flat faced trusses between the inner and outer wall plates which give great rigidity to the wall of the box and which cannot easily be broken down by vibration or shock to the wall plates and which by reason of the broad contact surfaces make the wall plates themselves much less liable to be bent or crushed in by lateral pressure or shocks than if the corrugations were rounded in such manner as to give only a narrow line of contact.

Each of the six members A, B, C, D, E and F is formed with rolls or curls on those edges which are shown free in the knock down position of Fig. 2 which are adapted to interlock the rolls or curls in the adjoining free edges of the other members when the six members are set up, the front edge of the cover E and the top edge of the front A being adapted to be fastened together by a removable locking rod or other suitable fastening, as will be hereinafter described.

Figure 1:
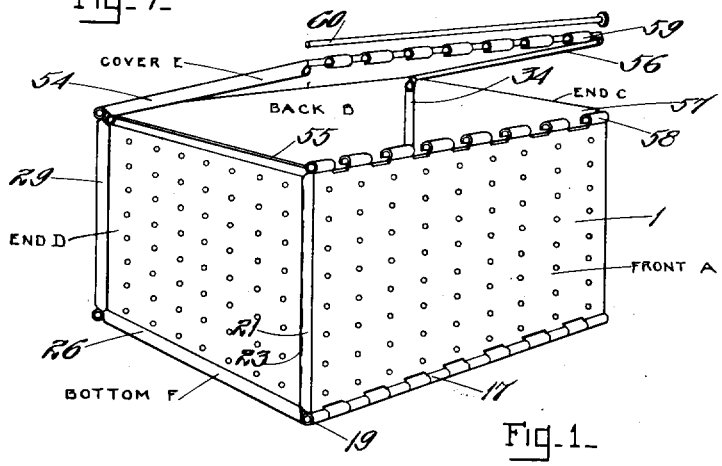
Figure 6:
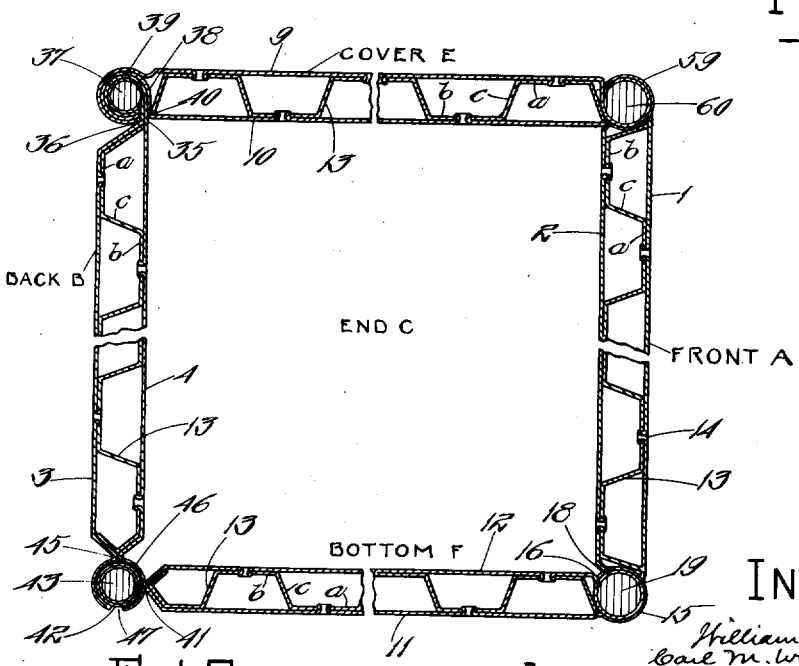
Fig. 6 is a vertical cross section of the box at right angles with the view shown in Fig. 5.

The front edge of the outer plate 11 of the bottom F is formed with a series of curled fingers or knuckles 15 and the inner plate 12 of the bottom is formed with a corresponding series of curls or knuckles 16 which are curled inside of the knuckles 15. The outer plate 1 of the front A is formed on its lower edge with a series of curled fingers or knuckles 17 and the inner plate 2 of the front is formed with a corresponding series of curls or knuckles 18 which fit inside of the knuckles 17, the knuckles 17, 18, being adapted to fit into the spaces between the knuckles 15, 16, of the bottom as shown in Fig. 1. A rod 19 passes through the knuckles of the front A and bottom F to fasten them together as shown in Figs. 1 and 6. This rod 19 is preferably secured against withdrawal in any suitable manner, preferably by making it fast or fitting tight within the knuckles 16, the knuckles 18 being sufficiently loose on the rod so that the front A may be turned down on the rod as a pivot to bring the front down flat in plane with the bottom F as shown in Fig. 2 when the box is knocked down.

The left hand ends of the plates 1, 2, which form the front A, as viewed in Fig. 1, to which the end D is connected, are formed with inward curls, respectively, the curl of the inner plate being inside of the curl 21 of the outer plate, and being curled around the stiffening rod 22. These curls are formed with a series of elongated slots 23 passing through the curls of both plates. The lower edges of the inner and outer plates 7, 8 of the end wall D are formed respectively with the curled tongues 24, 25 as shown in Fig. 3, the tongues of the outer plate being curled within the tongues of the inner plate. These tongues pass through the slots 23 and hook around the curl 21, thus forming a pivotal connection between the end D and the front A.

One edge of both the inner and outer plates of the bottom F is curled, one within the other, forming a roll 26, curled around the stiffening rod 27, and the coöperating edges of the outer and inner plates of the end D are curled, one within the other, forming a double lip 28 which is adapted to engage the curled roll 26 of the bottom when the box is set up.

The left hand end of both the inner and outer plates of the back B form a curled roll 29 around a stiffening rod 30 and the coöperating edges of the inner and outer plates of the end D are formed with a double curled lip 31 which is adapted to engage with the curled roll 29 when the box is set up.

The end C is connected with the back B in similar manner to that in which the end D is connected with the front A. The edges of the two plates 3 and 4 of the back are formed with a curled roll, one within the other, forming a curl 32 around the stiffening rod 33. The roll 32 is formed with a series of elongated slots similar to the slots 23 in the roll 21 of the front to which the end D is connected. The inner and outer plates 5, 6, of the end C are formed with curled tongues, one within the other, forming a series of tongues 34 which curl around the roll 32 and engage with the slots in the roll 32 when the end C is folded down over the back B as shown in Fig. 4.

The cover E and the back B have a hinge connection with each other. The inner and outer plates of the back B are formed with outwardly curled rolls 35, 36 the curl of the outer plate being curled within the curl 35 of the inner plate around the stiffening rod 37. The inner and outer plates 10, 9 of the cover are formed respectively with the curled tongues 38, 39 one within the other, which curl around the roll formed by the curl 35, 36 of the back B. The roll formed by the curl 35, 36 is formed with elongated slots 40 through which the tongues of the cover pass when the cover is turned back as shown in Fig. 4.

The bottom F and the back B have a draw-hinge connection with each other. The inner and outer plates 11, 12 of the bottom are drawn together near the edge forming a neck 41 and then are curled around forming an eye 42 which is curled around the rod 43. The neck 41 is provided with a series of elongated slots 44, as shown in Fig. 7.

The outer and inner plates 3, 4 of the back B are drawn together forming a neck 45 and then are spread and turned back upon themselves as shown in Fig. 7, and have a series of projecting portions corresponding in width with the elongated slots 44 which are spread and curled back upon themselves as shown in Figs. 4 and 7 forming a series of open eyes 46 which embrace the roll 42. The space 47 formed between the lids of the eyes 46 is of a width sufficient to permit lateral passage of the neck 41 of the bottom so that when the back and the bottom are turned down into the same plane, as shown in Fig. 7, the bottom and the back may be separated from each other by a lateral movement as will be obvious. When they are assembled, however, as shown in Fig. 7, if the back B is turned up at right angles with the bottom, the lids of the eyes 46 will engage with the slots 44 and lock the two members together to prevent lateral disengagement. The portion of the outer plate 3 of the back B between the eyes 46 is turned back to form a clamp 461 which more closely binds together the inner and outer plates and the intermediate corrugated plate as shown in Fig. 4.

The end C and the bottom F are constructed in such manner that the two may be engaged and the box set up in similar manner to the engagement of the end D and bottom F; that is, the inner and outer plates of the bottom are formed with curled edges, one within the other, forming a roll 48 around a rod 49, see Fig. 3, which is adapted to be engaged by the outwardly curled lip 50 formed by the edges of the inner and outer plates of the end C.

The end C and front A are adapted also to be connected in a similar manner as the end C and the bottom F and the inner and outer plates of the front A are formed with a roll 51 around the rod 52 which is adapted to be engaged by the curled lip 53 formed on the edges of the inner and outer plates of the end C.

The cover E is formed on one edge with a roll 54 made by the edges of the outer and inner plates 9, 10 curled around the rod 541 which is adapted to engage with an outwardly curled lip 55 on one edge of the end D formed by the combined edges of the outer and inner plates 7, 8, and the cover E is also formed with a roll 56 around the rod 561 on the opposite edge from the roll 54 which is adapted to engage with a curled lip 57 formed by the combined edges of the outer and inner plates of the end C. When the box is set up, and the cover is closed, the rolls 54, 56, can easily be sprung into engagement with the lips 55 and 57, respectively, of the ends D and C.

When the box is fully assembled and filled and the cover is ready to be closed, there should be some suitable locking means. That which I have shown and prefer is as follows: The upper edges of both plates 1, 2, of the front A are formed with a series of corresponding projections which are curled over, one within the other, forming a series of eyes 58 and the front edge of the plates forming the cover E are formed with a series of curled eyes 59 corresponding with the spaces between the eyes 58 of the front so that the eyes of the cover and the front will match together when the cover is closed, and a locking rod 60 is provided, which, when the cover is closed, may be passed through the eyes of both the cover and the front. Any other suitable locking mechanism may be provided.

Assuming the box to be in its knocked down form, the set comprising the cover, the back and the end C are folded as shown in Fig. 4, the end being folded over onto the back, and the set comprising the front, the bottom and the end D are folded as shown in Fig. 3, the end D being folded onto the front A. In order to set up the box, the two sets are first joined together by engaging the two members of the draw hinge with each other; that is, by engaging the roll 42 of the bottom with the eyes 46 of the back B by a lateral sliding movement; then the two ends C and D are turned up into a vertical position as shown in Fig. 2. The front A may then be turned up into a vertical position, thereby also turning the end D on edge endwise through ninety degrees, so that the lip 28 may be sprung into engagement with the roll 26 on the bottom F. The back B may then be turned up so that the lip 31 of the end D may be sprung into engagement with the roll 29 of the back and in turning up the back B, the end C will also be turned edgewise so as to bring the lip 50 to the bottom where it may be sprung into engagement with the roll 48 of the bottom F and the lip 53 of the end C may be sprung into engagement with the roll 51 of the front A. The parts will then all be in the set up position shown in Fig. 1. When the box is filled and it is desired to close the box by turning down the cover, the rolls 54 and 56 will spring over the lips 55 and 57 of the ends C, D, the eyes 59, 58, will match together as already described and the locking rod 60 may be inserted in place.

When knocked down and the two sets are separated, the end D may be folded over flat onto the front A, as shown in Fig. 3, while the bottom F is left open, and the end C may be folded over flat onto the back B, as shown in Fig. 4, when the cover E is left open. Now one set may be placed on top of the other set, in such manner that the double layer of members of one set will rest on the single layer of the other set, and the single layer will rest on the double layer so as to make a level pile three layers deep, in compact form for shipment of the case back to the original shipper to be used again.

What I claim is:

1. A knock down metallic box comprising a cover, bottom, front, back and two end walls, one of the end walls and the bottom being hinged to adjacent edges of the front wall, the other end wall and the cover being hinged to adjacent edges of the back wall, one edge of the bottom having a draw-hinge connection with the back wall, said draw-hinge connection consisting of a plurality of knuckles formed with longitudinal slits therein which project from one of said last two members, the other of said two members having a portion thereof formed as a pintle with a slotted neck which has a slidable connection with said knuckles when said two members are in the same plane with each other and the neck of the pintle is in alinement with the said slits, said knuckles and pintle interlocking by engagement of the knuckles with the slots of the neck to prevent disengagement when said two members are turned at an angle to each other.

2. A knock down metallic box comprising a cover, bottom, front, back and two end walls, one of the end walls and the bottom being hinged to adjacent edges of the front wall, the other end wall and the cover being hinged to adjacent edges of the back wall, one edge of the bottom having a draw hinge connection with the back wall, one of said last two members having slotted knuckles which project therefrom and the other of said two members having a portion thereof formed as a pintle which has a slidable connection with said knuckles thereby forming the draw hinge connection, other edges of said end walls being formed with curled spring lips and other edges of the top, bottom, front and back being formed with curled rolls with which said spring lips engage when the box is set up forming a locking connection of all the parts.

3. A knock down metallic box having six walls, combined in sets of three each, one wall of one set having its edge formed with slotted hinge knuckles, the other set of members having one edge of one wall terminating in a slotted neck and a curled roll forming a pintle which is adapted to engage with the slotted knuckles of the other set, whereby the two sets may be hinged together, the contiguous edges which are free when the box is in a knock down position being formed some with curled lips and the others with curled rolls which interlock with the curled lips when the box is set up.

4. A knock down metallic box having a cover, bottom, two ends and two sides all pivotally connected together and adapted to be spread out in single layer when in the knocked down position and opened out, the edges which are free when in the knocked down position being adapted when the box is set up, to interlock with each other, the six members being divided into two sets of three each, one set having on the edge of one of its members a series of hinge knuckles with longitudinal slits therein, the other set having on the edge of one of its members a slotted neck and a curled roll forming a hinge pin which is adapted to be engaged with the slotted knuckles of the other set by a sliding movement when the two sets are spread out and which will lock the two sets together when the said two members are turned at an angle to each other.

5. In a knock down box formed of metallic plates, a wall plate having one of its edges formed with a curled roll with a series of slots, another wall plate having one of its edges formed with a series of curled tongues which are adapted to engage with the slots in the roll of said first plate and form a hinge connection therewith, the other edge of said second plate being formed with curled lips, the contiguous edges of the other wall plates which are to be connected with said second plate being formed with curled rolls with which said curled lips are adapted to be engaged when the box is set up.

6. A knock down box having double walls composed of sheet metal plates spaced apart from each other, and a corrugated strengthening plate of sheet metal between the inner and outer plates composing said walls, said corrugated plate having its corrugations contacting alternately with said inner and outer walls and secured thereto in the lines of contact.

7. A knock down box having double walls composed of sheet metal plates spaced apart from each other, and a corrugated strengthening plate of sheet metal between the inner and outer plates composing said walls, said corrugated plate having its corrugations formed with flat surfaces contacting alternately with said inner and outer walls and secured thereto in the planes of contact.

8. A knock down box having double walls consisting of inner and outer sheet metal plates parallel with and spaced apart from each other and interposed truss plates each having flat faces which are in parallel planes and having strut-portions connecting said flat faces, the faces in the two planes respectively contacting with the said inner and outer plates and being rigidly and permanently secured to the respective plates with which they contact.

9. A knock down box having double walls each composed of sheet metal plates spaced apart from each other, and corrugated strengthening plates of sheet metal between said two plates, said corrugated plates each having flattened surfaces which contact alternately with said inner and outer wall plates and are rigidly and permanently secured to the respective wall plates with which they contact and having strut portions which connect said contacting faces of the corrugated plates.

10. A knock down box having double walls each composed of inner and outer sheet metal plates spaced apart from each other and strengthening plates of sheet metal between said inner and outer plates, said strengthening plates each having flattened surfaces in two different planes which respectively contact with said inner and outer plates and are rigidly and permanently secured to the respective wall plates with which they contact and have strut portions which extend across the space between the wall plates and connect together said flattened inner and outer contacting surfaces, the strut portions which are adjacent each other being at an obtuse angle to the contacting faces of said strengthening plates.

11. A knock down box having double walls throughout formed of inner and outer plates with an air space between them and having corrugated strengthening plates between the inner and outer wall plates, the said plates being formed with eyelets integral therewith which secure the wall plates and stengthening plates together.

12. A knock down box having double walls throughout formed of inner and outer plates with an air space between them and having corrugated strengthening plates between the inner and outer wall plates, the said plates being formed with eyelets integral therewith which secure the wall plates and strengthening plates together, said eyelets being formed by swaging the outer plate through the corrugated plate and swaging the corrugated plate through the inner plate.

13. A knock down box having double walls composed of sheet metal plates with a space between the inner and outer plates and corrugated metallic plates between the inner and outer plates riveted thereto, said corrugated plates being formed to contact alternately with the inner plate and the outer plate.

14. A knock down box having one of two adjacent members formed with a curled lip with a series of slots therein, the other of said two adjacent members having one edge formed with a series of curled tongues which are adapted to engage with the slots in the said first member by a turning movement and form a hinge connection therewith and lock the two members together when one is turned up at an angle to the other and which are separable only by turning them into the same plane with each other.

15. In a knock down box one wall thereof having one edge formed with a series of projecting tubular knuckles with longitudinal slots therein, and an adjoining wall having one edge formed with a projecting neck portion adapted to be passed through the slots in said knuckles lengthwise of the slots and terminating in a roll forming a pintle adapted to loosely fit in said knuckles, said neck being formed with slots with which the edges of the knuckles are adapted to engage to permit the member with which the pintle portion is connected to turn with relation to the other member.

16. A knock down box having a front, back, bottom, two ends and a cover, one of said members having a separable draw-hinge connection with one of the others so constructed that said two members may be connected together or separated from each other only when in the same plane with each other and which interlock to prevent separation when turned at an angle to each other.

17. A knock down box having a front, back, bottom, two ends and a cover, each of said six members having a double wall formed by an inner and an outer plate with an air space between them, means for uniting together the inner and outer plates of each double wall, the front and bottom having on their contiguous edges curled knuckles which break joints and inter-engage with each other and a hinge pivot connecting them, the back and cover having a hinge connection with each other similar to the hinge connection of the front and bottom, the front having on one edge an incurled roll with a series of slots, and one of the ends having on one edge a series of outwardly curled tongues which are adapted to engage with said slotted roll and form a hinge connection therewith, the back and the other end having a slotted roll and tongue connection similar to that of the front and first end, a draw-hinge connection between the back and the bottom, whereby the back and bottom may be hinged together or separated from each other when in the knocked down position, the two ends having on those edges which are free in the knocked down position outwardly curled lips, and the cover, back, bottom and front having on those free edges which, when the box is set up, are contiguous to the curled lips of the ends, inwardly curled rolls with which the curled lips are adapted to be engaged when the box is set up.

18. A knock down box having a front, back, bottom, two ends and a cover, the front and bottom having on their contiguous edges curled knuckles which break joints and interengage with each other and a hinge pivot connecting them, the back and cover having a hinge connection with each other similar to the hinge connection of the front and bottom, the front having on one edge an incurled roll with a series of slots, and one of the ends having on one edge a series of outwardly curled tongues which are adapted to engage with said slotted roll and form a hinge connection therewith, the back and the other end having a slotted roll and tongue connection similar to that of the front and first end, a draw-hinge connection between the back and the bottom, whereby the back and bottom may be hinged together or separated from each other when in the knocked down position, the two ends having on those edges which are free in the knocked down position outwardly curled lips, and the cover, back, bottom and front having on those free edges which, when the box is set up, are contiguous to the curled lips of the ends, inwardly curled rolls with which the curled lips are adapted to be engaged when the box is set up.

19. A knock down box having double walls with an air space between the walls, means for uniting together the inner and outer walls of each of the six members which form the top, bottom, ends and sides of the box, the top, end and one side being pivotally connected together forming one set, the bottom, end and the other side being pivotally connected together and forming a second set, each set being adapted to be laid out in a flat position and one set having a draw-hinge connection with the other set, the inner and outer plates which form one of the walls of one set having projecting flanges which are shaped to form a series of slotted eyes, and the inner and outer plates of one of the walls of the other set having flanges which are adapted to form a neck terminating in a roll whereby the two sets may be hinged together by sliding the said roll of one member laterally into the eyes of the other member when the neck is in alinement with the opening between the lids of the eyes, and the two sets may then be locked together by turning the two hinged members at an angle to each other.

In testimony whereof we hereto affix our signatures.

WILLIAM H. DOBLE.
GRACE H. WHEATON,
*Administratrix of the estate of Carl M. Wheaton, deceased.*